Dec. 25, 1923.
W. C. FARNUM
1,478,851
SCREW CUTTING MACHINE
Filed July 26, 1921
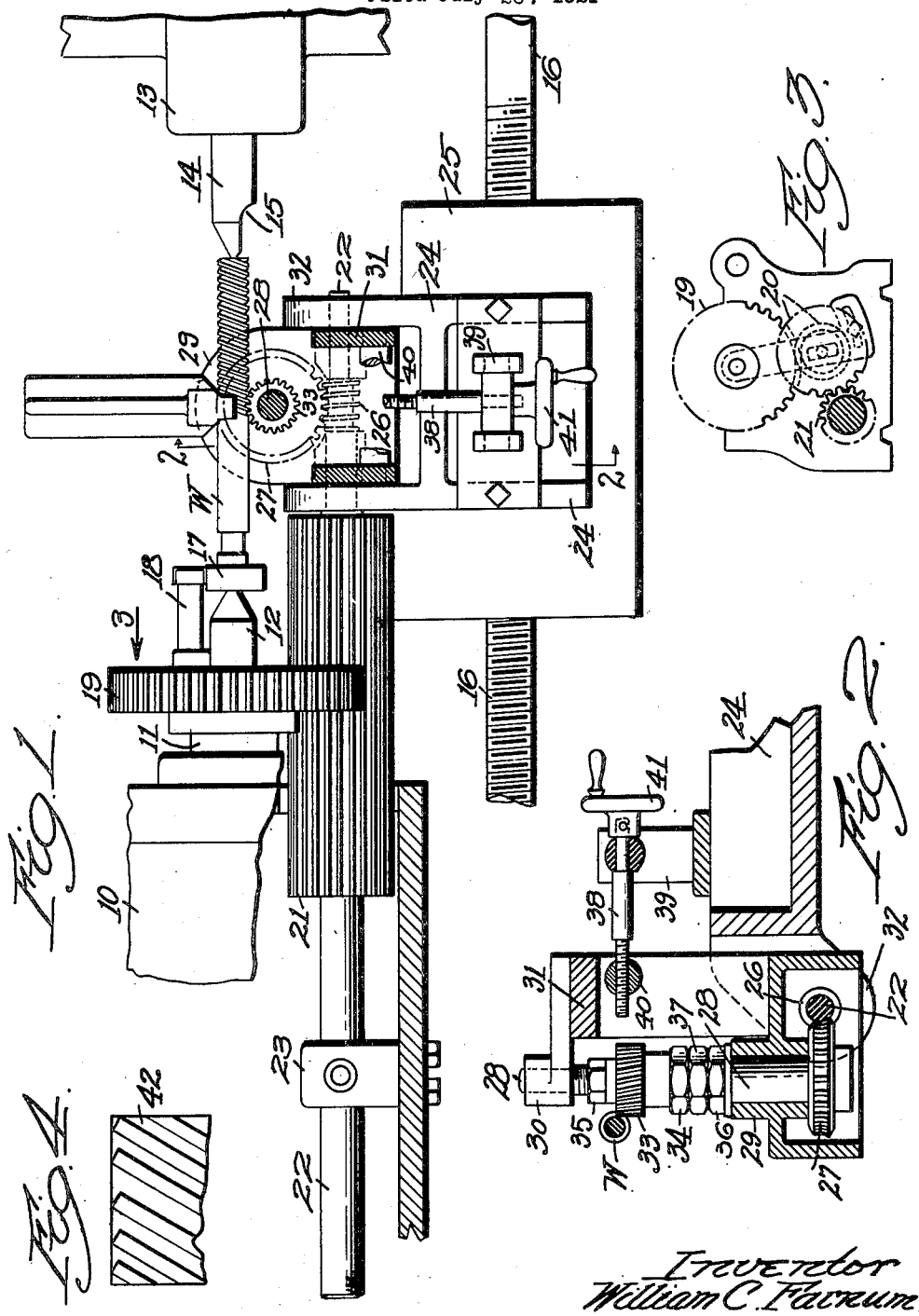

Patented Dec. 25, 1923.

1,478,851

UNITED STATES PATENT OFFICE.

WILLIAM C. FARNUM, OF FITCHBURG, MASSACHUSETTS.

SCREW-CUTTING MACHINE.

Application filed July 26, 1921. Serial No. 487,800.

*To all whom it may concern:*

Be it known that I, WILLIAM C. FARNUM, a citizen of the United States, residing at Fitchburg, in the county of Worcester and State of Massachusetts, have invented a new and useful Screw-Cutting Machine, of which the following is a specification.

This invention relates to a machine for cutting screw threads and is particularly adapted to the cutting of large or coarse threads and also of threads of very steep pitch such as double or triple threads.

It is the general object of my invention to provide a machine by which screw threads may, if desired, be completely cut at a single operation and by the use of which marked economy in time and labor may be effected.

With this general object in view, an important feature of my invention relates to the provision of a rotatable toothed cutter with its cutting edges formed at the ends of the teeth. I also provide means for rotating the work and the cutter and for moving the cutter in the direction of the axis of the work, both movements of the cutter being in definite predetermined relation to the rotation of the work.

My invention further relates to arrangements and combinations of parts which will be hereinafter described and more particularly pointed out in the appended claims.

A preferred form of my invention is shown in the drawings in which—

Fig. 1 is a plan view of portions of a lathe embodying my improvements;

Fig. 2 is a transverse sectional elevation taken along the line 2—2 in Fig. 1;

Fig. 3 is a side elevation of the head stock, looking in the direction of the arrow 3 in Fig. 1; and Fig. 4 is a detail view of a special cutter.

Referring to the drawings, I have shown portions of a lathe including a head stock 10, a spindle 11 having the usual live center 12 and a tail stock 13 supporting a dead center 14 preferably having a clearance recess 15 formed in one side thereof. I have also shown the usual lead screw 16 which is connected by the usual change gearing, not shown, so that it may be rotated in definite relation to the rotation of the spindle 11.

The work W may be supported on the centers 12 and 14 or in any other manner and may be rotated by a lathe dog 17 and driver 18. The driver 18 is shown herein as secured in the face of a gear 19 which takes the place of the usual face plate on the spindle 11.

The gear 19 is connected through adjustably mounted change gears 20 (Fig. 3) to a broad faced pinion 21 fixed to a shaft 22. One end of the shaft 22 is slidable in a bearing 23 fixed to the frame of the lathe and the other end of the shaft 22 is supported in bearings in a frame 24 mounted on the usual lathe carriage 25. The carriage 25 is provided with the usual nut (not shown) engaging the lead screw 16 by which it is moved longitudinally in definite relation to the rotation of the spindle 11.

As the carriage 25 moves longitudinally, the pinion 21 moves axially with the carriage and the shaft 22 slides in the bearing 23, thus maintaining continuous driving connection between the gear 19 and the pinion 21.

A worm 26 is formed near one end of the shaft 22 and meshes with a worm wheel 27 on the lower end of a vertical shaft 28, rotatable in bearings 29 and 30 in a support 31 mounted to swing about the axis of the shaft 22 and between flanges 32 on the rear end of the frame 24. A toothed cutter 33 is mounted on the shaft 28 and may be adjusted vertically thereon by nuts 34 and 35, the shaft itself being also axially adjustable for end play by adjusting and lock nuts 36 and 37.

The cutter 33 is keyed or otherwise secured to the shaft 28 so as to be rotated positively therewith. The appearance of the cutter 33 is substantially that of a spiral gear, the angle of the teeth corresponding to the angle of lead of the screw to be cut.

The depth of the cut is controlled by adjustment of the support 31 about the axis of the shaft 22. For such adjustment I have provided an adjusting screw 38 having a swivel bearing in a bracket 39 on the frame 24 and threaded into a stud 40 rotatably mounted in the support 31. A hand wheel 41 may be used to turn the screw 38 and thus adjust the cutter toward or from the axis of the work.

Having described the construction of my improved machine I will now explain the method of operation thereof.

If the cutter 33 were to be fed toward the work without any movement along the axis of the work and at the same time were to be rotated at a speed exactly corresponding to the feed of the desired thread, the cutter would produce a full screw thread at the point exactly opposite the axis of the cutter, the depth of the cut decreasing at each side of this point until the cutter clears the surface of the work. If, as in my machine, such a cutter is given a slightly increased rate of rotation and at the same time is moved bodily axially of the work, at such a rate of speed as to exactly offset the increased rate of rotation of the cutter so as to cause the pitch line of the cutter to travel in unison with the lead of the screw being cut, the field of the cutting operation will be moved along the work, producing a screw thread of any desired length which may be finished to its full depth at a single operation if so desired.

It is customary to position the cutter in the recess 15 of the dead center at the start of the cut and to feed the cutter toward the work by means of the hand wheel 41 until it assumes the correct cutting position. The machine is then started, and the cutter is moved along the axis of the work, at the same time revolving upon its own axis. The gearing for the lead screw 16 must, of course, be selected with reference to the number of teeth and the pitch of the cutter 33 and also to the gear ratio between the speed of rotation of the work and of the cutter shaft. Double, triple or quadruple threads may be cut by exactly the same process as single threads, the only difference being in the pitch of the teeth on the cutter 33. If the pitch of the cutter is equal to the lead of the screw to be cut, a single thread will be produced; if the pitch is one half the lead, a double thread; if one third, a tripple thread and similarly for still coarser threads.

For very steep threads, a cutter 42 of the form shown in Fig. 4 may be used, the ends of the teeth being ground so that the cutting portions are substantially perpendicular to the line of cutting action.

It is possible to cut helical gears by using a cutter of correct design and it is obvious that the machine may be used to produce various shapes and to remove stock, in addition to the production of screw threads and helical gears.

Having thus described my invention and the operation thereof, it will be seen that my improved machine is capable of producing threaded work in large quantities and with great rapidity, as the complete thread may be cut at a single operation. Furthermore, the thread is cut by a large number of cutting teeth instead of by a single thread tool and the cutter may be indefinitely renewed or sharpened by merely grinding the cutting surface thereof.

It will be further evident that changes and modifications may be made in my invention within the spirit and scope thereof as set forth in the claims and I do not wish to be otherwise limited to the details herein disclosed but what I claim is:—

1. A screw cutting machine comprising a support for the work, means to rotate the work, a carriage, a toothed cutter rotatable on said carriage at the side of the work with its axis substantially perpendicular to the work axis, means to rotate said cutter, means to move said cutter carriage axially of the work, and manual means to feed the cutter toward the work, said cutter rotating means comprising a worm gear connected to turn said cutter, a worm meshing therewith, a worm shaft rotatably mounted in said carriage and movable axially therewith, an elongated pinion fixed on said worm shaft, a driving gear engaging said pinion in every axial position thereof, and means to rotate said driving gear in fixed relation to the rotation of the work.

2. A screw cutting machine as set forth in claim 1 and having a vertical shaft to the ends of which the cutter and worm gear are secured, and a box-like bearing frame for said shaft, said carriage having a pair of rearwardly projecting guides closely embracing said frame and said frame being mounted for angular movement about the axis of said worm shaft between said guides, and said feeding means being effective to hold said frame in adjusted angular position relative to said carriage.

In testimony whereof I have hereunto affixed my signature.

WILLIAM C. FARNUM.